(12) United States Patent
Feng et al.

(10) Patent No.: US 10,206,036 B1
(45) Date of Patent: Feb. 12, 2019

(54) METHOD AND APPARATUS FOR SOUND SOURCE LOCATION DETECTION

(71) Applicant: Alibaba Group Holding Limited, Grand Cayman (KY)

(72) Inventors: Jinwei Feng, Bellevue, WA (US); Tao Yu, Bellevue, WA (US)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/056,386

(22) Filed: Aug. 6, 2018

(51) Int. Cl.
*H04R 3/00* (2006.01)
*H04R 1/40* (2006.01)
*G06K 9/00* (2006.01)

(52) U.S. Cl.
CPC ......... *H04R 3/005* (2013.01); *G06K 9/00228* (2013.01); *H04R 1/406* (2013.01); *H04R 2201/403* (2013.01); *H04R 2410/01* (2013.01)

(58) Field of Classification Search
CPC .. H04R 3/005; H04R 1/406; H04R 2201/401; H04R 2410/01; H04R 2201/403; G06K 9/00228

USPC .......................................................... 381/92
See application file for complete search history.

(56) References Cited

U.S. PATENT DOCUMENTS

2011/0164760 A1* 7/2011 Horibe .................. G01S 3/8006
381/92

\* cited by examiner

*Primary Examiner* — Paul S Kim
(74) *Attorney, Agent, or Firm* — Lee & Hayes, PC

(57) ABSTRACT

A method of detecting respective source locations of sounds in an audio signal. The method includes receiving the audio signal via a horizontal set of microphones and a vertical set of microphones. The respective source locations of the sounds in the audio signal are determined by analyzing the audio signal. Analysis is conducted with respect to the horizontal set of microphones and with respect to the vertical set of microphones, to determine a respective horizontal direction to the respective source locations of the sounds, and determine a respective vertical direction to the respective source locations of the sounds. The distance is calculated between the respective source locations of the sounds and the horizontal set of microphones and the vertical set of microphones.

20 Claims, 12 Drawing Sheets

METHOD AND APPARATUS FOR SOUND SOURCE LOCATION DETECTION

BACKGROUND

In the modern era, a strong emphasis exists on providing automated technology to reduce human labor costs, improve productivity, and improve accessibility to a variety of individuals including those with physical and/or mental disabilities and limitations. One of the technological fields that may help to achieve the above benefits is in machines that can listen to and respond to human voice commands. Currently, voice-activatable machines are capable of performing a multitude of tasks. However, in some situations such as a noisy environment, these machines have difficulty detecting the location of the voice or source of sound in order to properly process the commands being given.

Determining the location of a source of sound is generally a fairly simple process for a human with normal hearing and sound processing capabilities, even amidst an environment filled with ambient noise. That is, in an environment in which a mixture of similar and distinct sounds are being created by multiple sources, the average human has the ability to locate the source of a target sound by mentally filtering out distinct and unimportant noises using auditory and visual cues, and then orienting his or her body to the direction from which the sound is emanating.

In contrast, in a noise-filled environment, a machine with a single microphone has difficulty detecting the location of a target sound source (e.g., a human voice giving commands) for many reasons. For example, a machine using a single microphone cannot tell the incident angle and distance of a sound source, unlike the binaural hearing mechanism of human beings. In addition, a stationary machine, for example, even with a fixed directional microphone cannot reorient itself for better sound pickup. Further, in an environment, such as a busy subway station, a train station, an airport, a casino, an event stadium, a metropolitan street, etc. even if a soundwave emanates directly at the machine intentionally, there is a strong likelihood of the machine receiving multiple soundwaves that are unintentionally directly-oriented. For example, in a subway station, an individual may be standing near the machine and giving commands, while simultaneously, passersby or bystanders may be present and talking while facing the machine also. In addition, there may be other ambient noise being reflected or directed to the machine, such as the mechanical sounds of arriving subway cars, music being played live or over station speakers, informational announcements, sounds of people moving on the floor, etc. All of these combined sounds in an environment may interfere and obfuscate the speech of the individual giving commands intended for the machine. As such, the machine may have difficulty in deciding on which sound to focus, and may subsequently terminate the listening procedure. In summary, a machine with a fixed microphone lacks the human binaural hearing capability, mental filtering mechanism, and re-orientation mobility to locate a speech source.

Thus, improved machine sound source location capabilities is desired.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

This disclosure is directed to an apparatus, a system, and a method for improved sound (e.g., voice, etc.) source location detection via electronic means. Although the concept of machines that can "hear" and interpret sounds, such as human speech, has been around for several decades, in recent years, several companies have developed devices specifically configured to interact with humans directly through speech. Understanding that there are obvious limitations depending on the circumstances, humans are generally capable of discerning specific sounds, such as a human voice, in an atmosphere where there are interfering noises. Furthermore, humans generally have the ability to readily reorient their bodies in order to locate the source of a specific sound. In contrast, due to the distinctions between the way a human hears and processes sound compared to how a machine receives sound, given the same environment, machines may struggle to understand and interpret the same sounds due to the challenge of determining which sound came from which direction, and further, on which sound (or voice) the machine should focus. Thus, this disclosure relates to the ability of a machine to intake audio signals from a noisy environment and parse out the sounds. In an embodiment, a machine receives an audio signal including a human voice and may determine which noise within the signal corresponds to the human voice to pay attention to and interpret commands from the human voice.

As explained herein below, an embodiment of the instant application may be embodied in a machine having one or more processors that, when executed, cause the machine to perform acts (e.g., operations, steps, etc.). Note, for the purposes of this application any discussion or recitation of an act being performed by the one or more processors of a machine includes the possibility that the act may be performed directly by the one or more processors of the machine at the location of the machine, as well as the possibility that one or more of the executed acts may be executed by one or more remote processors and/or servers that are in communication with the machine via a network. In other words, one or more of the acts performed according to the instant disclosure may be signaled for processing or initialized for processing by the one or more processors of the machine to be actually carried out by a remote processor/server, and results thereof may then be relayed back to the machine from the remote processor/server. For example, an embodiment of a machine of the instant disclosure may be connected to a cloud-computing service or other remote-based processing center such that the need for robust processing power at the machine is minimized.

Illustrative Embodiments of an Apparatus for Sound Source Location Detection

Figure 1:
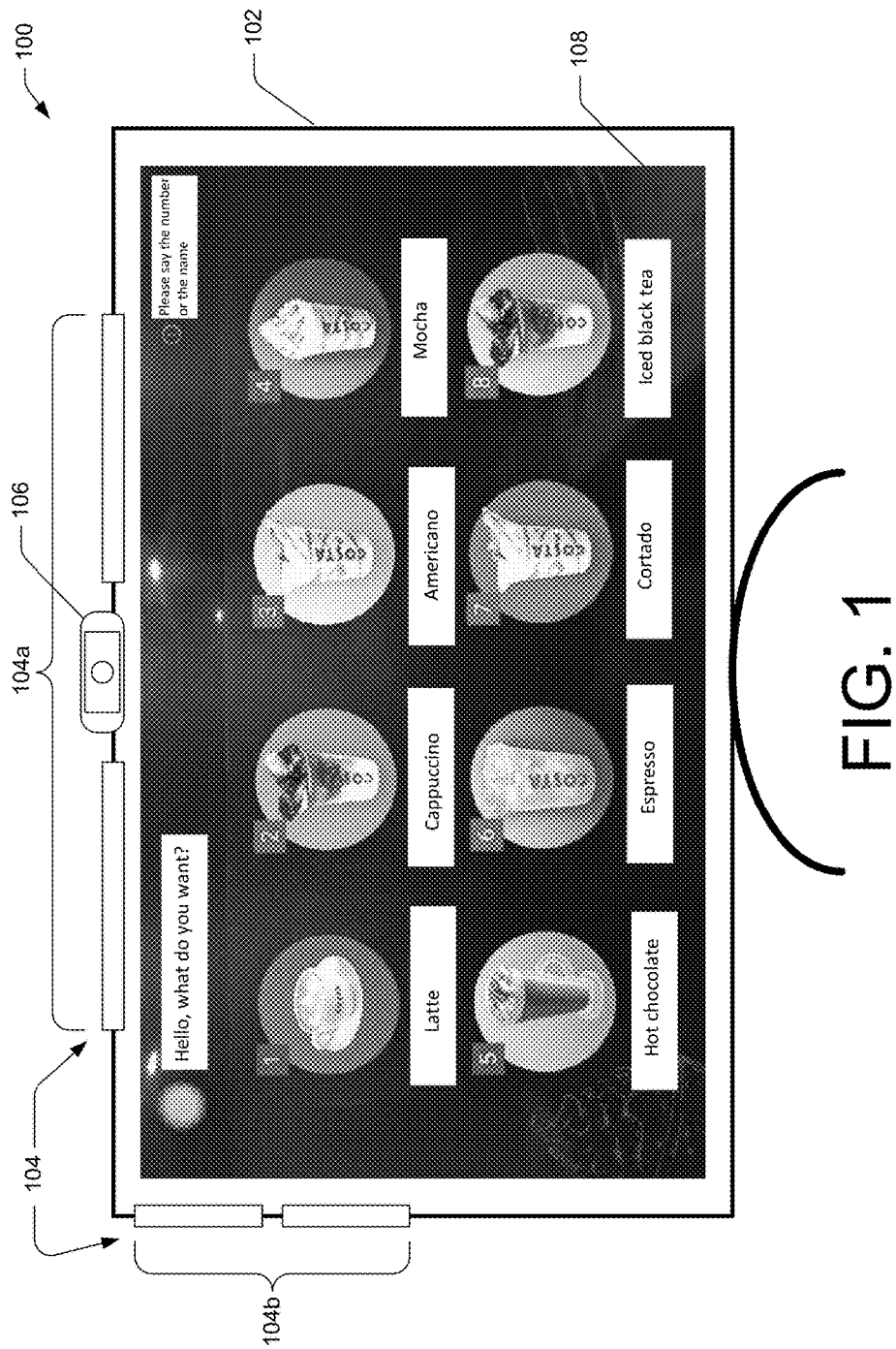
FIG. 1 illustrates an apparatus for detecting a sound source location according to an embodiment of the instant disclosure.

In an embodiment as depicted in FIG. 1, an apparatus 100 for detecting respective source locations of sounds in an audio signal may include a housing 102 to contain and/or support the components of the apparatus 100. The apparatus 100 includes an array of microphones 104 (also referred to as "mic" or "mics" herein, see FIG. 7, e.g., "Mic0," Mic1," MicN") that are used to intake audio signals from the surrounding environment in which the apparatus is placed. The array of microphones 104 may include a first set of microphones 104*a* that are linearly-aligned in a horizontal orientation and a second set of microphones 104*b* that are linearly-aligned in a vertical orientation. Further, in an embodiment, the first set of microphones 104*a* that are linearly-aligned in a horizontal orientation may be located at a position centrally located at an upper side of the apparatus 100, so as to be aligned with a likely position in which a user will be positioned to address the apparatus. Additionally, the second set of microphones 104*b* that are linearly-aligned in a vertical orientation may be located at a position along a lateral edge of the apparatus 100 and, with respect to the vertical distance, the second set of microphones 104*b* may be closer to an imaging device (see below) of the apparatus than to the ground, i.e., for an embodiment of an apparatus that has an imaging device.

Note, though FIG. 1 depicts only two sets of microphones, it is contemplated that additional sets of microphones may be incorporated. In the event that additional sets of microphones are incorporated, it is further contemplated that the one or more additional sets may be linearly-aligned, curvi-linearly-aligned, or otherwise aligned, and may be horizontally oriented, vertically oriented, and/or diagonally oriented. Moreover, for the purpose of this disclosure, the term "set," as stated with respect to a "set of microphones," may be defined as at least two or more microphones oriented in a predetermined position and grouped together for the purpose of audio signal analysis.

With respect to analysis of audio signals received by the array of microphones 104, in an embodiment, audio signals received from each microphone within a set of microphones (e.g., horizontal set 104*a*, vertical set 104*b*) may be analyzed independently from any other microphone within the set. That is, while the audio signals from a set of microphones (e.g., Mic0, Mic1, Mic2, . . . MicN) may be still be analyzed collectively as a vertical or horizontal set of microphones, audio signals received by the individual microphones within the set may be considered independently from other adjacent microphones within the set. In an alternative embodiment, within the first and/or second set of microphones 104*a*, 104*b*, a user may define subsets of microphones, if desired. For example, assume a set of microphones included a total of eight microphones, the set may have further subdivisions of four or two microphones per subset. These subsets may be arranged such that microphones within a subset may be grouped relatively closer to each than to other microphones of a different subset within the set of microphones. Additionally, and/or alternatively, subsets of microphones within a set may be "grouped" only for analysis purposes rather than physically grouped in a subset, where the spacing between subsets may be greater than the spacing between individual microphones within a subset. That is, even if all microphones within a set are linearly-aligned and substantially equally spaced apart, the analysis of the received audio signals may be performed using analytical "subsets" of microphones (e.g., Mic0 and Mic1 are a subset, Mic2 and Mic3 are a subset, etc.).

In addition to the array of microphones 104, in an embodiment, apparatus 100 may include an imaging device 106 (e.g., still-photo camera, video camera, thermal imager, etc.) that may be implemented to view the environment around the apparatus 100 and assist in determining sound source locations. Although a particular position on the apparatus 100 may be beneficial, the location of the imaging device 106 may vary. Additionally, the imaging device 106 may be controllable to shift the orientation and/or focus the view to: 1) assist in determining the direction of arrival (DOA) of a sound; 2) assist in determining whether a sound is emanating from a person or an object; and 3) assist in interpreting and/or verifying the intention of the audio signal with respect to commands being issued to the apparatus. For example, an apparatus according to the instant disclosure may be implemented as an information or ticket-selling kiosk in a busy, noisy subway or train terminal. When a person walks up to use the kiosk, there may be interfering sounds arriving at the array of microphones 104, blended with the voice of the person trying to use the kiosk. As the apparatus 100 begins to analyze the audio signals (as discussed further herein) being received by the array of microphones 104, the apparatus 100 may actuate the imaging device 106 to view the sound source locations being detected to determine whether the image at a particular sound source location indicates the location of the person using the apparatus 100. Notably, the imaging device 106 may be controlled automatically by programming controls in the apparatus 100, and/or the imaging device 106 may be controlled remotely by electronic or manual means via commands sent over a network to which the imaging device 106 may be communicatively coupled.

Thus, if the imaging device 106 detects a human face in the image of a sound source location, the image at that location and the audio signal arriving from that sound source location may be further evaluated for confirmation of a person trying to use the apparatus 100 in order to proceed with responding to the person's questions or commands. Alternatively, if the imaging device 106 does not detect a human face within the image of a sound source location, the audio signal arriving from that source location may be disregarded by the apparatus 100 as being an interference sound, and either not human or not intended to attract the attention of the apparatus 100 (i.e., it may be a human voice that is reflected from a surface opposing the array of microphones 104, in which case, it is unlikely that the voice is intending to communicate with the apparatus 100).

Additionally, and/or alternatively, in an embodiment, imaging device 106 may be implemented to identify an individual who has stopped in view of the apparatus 100 as a potential user of the apparatus 100. In such a situation, imaging device 106 may send a signal to activate the array of microphones 104, thereby alerting the apparatus 100 to begin processing the audio signals being received.

Apparatus 100 may further include a display member 108, as depicted in FIG. 1. Display member 108 may display information related to the recognized verbal questions or commands from a user of the apparatus 100. For example, the display member 108 may display information including, but not limited to: visual confirmation that the apparatus 100 is accurately understanding the user; visual/textual prompts that the user may say to further use the apparatus 100; visual display of maps, addresses, transportation routes, store listings, products, prices, etc. that the user may have requested or about which the user may have inquired. Additionally, in the event that the array of microphones 104 malfunctions or the apparatus 100 is otherwise unable to accurately understand the user for a variety of possible reasons (e.g., excessive environmental interference sound or volume thereof, unfamiliar accent in speech, inadequate language capabilities from either the user or the apparatus 100, mechanical or electrical problems with the array of microphones 104, etc.), the display member 108 may further include touch screen technology incorporated therein as an alternative form of communication with the user.

Other features and components (not shown) may be incorporated with apparatus 100 to complement the intended usage of the apparatus 100. For example, the apparatus 100 may be paired with a ticket vending/production device, a product vending/production device, a receptacle device to receive items from the user, a printing device, etc. That is, the apparatus 100 may be adapted to a variety of environments for a variety of uses including, but not limited to: selling/printing transportation tickets/vouchers in a transportation hub; arranging for transportation pick-up (e.g., requesting a taxi or other ride service); donation collection for food, clothing, etc.; sale/production of food, beverages, consumer goods, etc.; gambling; printing directions or documents; consumer assistance in a store or shopping center; vehicle rental with key delivery; etc.

Illustrative Embodiments of Detecting Sound Source Locations

Figure 2:
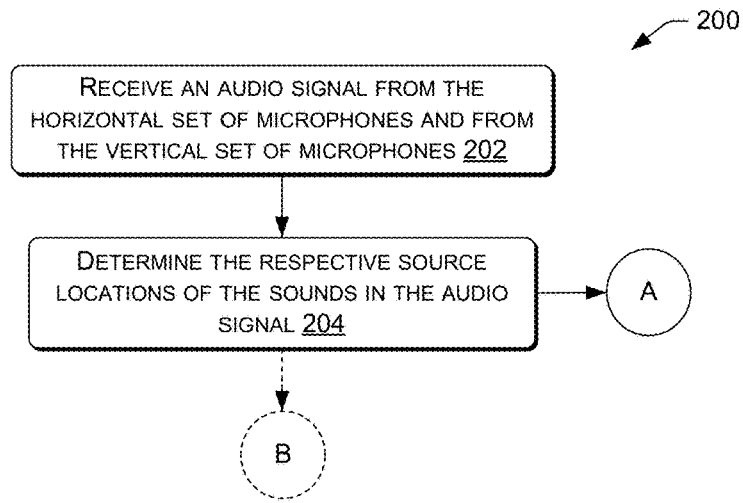
FIG. 2 illustrates a flow chart of a method for detecting a sound source location according to an embodiment of the instant disclosure.
Figure 3:
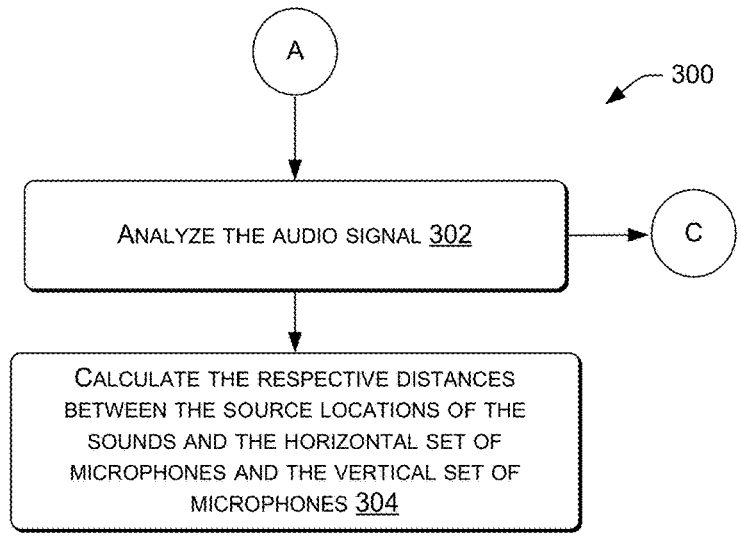
FIG. 3 illustrates a flow chart of a method for determining the sound source locations of sounds in audio signals according to an embodiment of the instant disclosure.

FIG. 2 depicts a flow chart of acts in a method 200 for detecting a sound source location. In an embodiment, method 200 includes an act 202 of receiving an audio signal from a horizontal set of microphones and a vertical set of microphones. Using the audio signal (or signals from each microphone), in act 204, the respective sound source locations of the sounds in the audio signal are determined. In FIG. 3, the method 300 is depicted, which shows the acts performed to execute act 204 of determining the sound source locations. In an embodiment, method 300 may include act 302 of analyzing the audio signal(s) and an act 304 of calculating the respective distances between the source locations of the sounds and the horizontal set of microphones and the vertical set of microphones, or otherwise the apparatus in which the array of microphones is embodied. In an embodiment according to the instant disclosure, a distance of 1 to 6 feet between the sound source location and the apparatus may be advantageous for more accurate understanding of voice commands and inquiries. Note, in an embodiment, acts 302 and 304 may be executed together. Ultimately, the audio signals from both the horizontal array of microphones and the vertical array of microphones are analyzed to calculate the pan, tilt, and distance of the targeted speech source in a very noisy environment.

Figure 4:
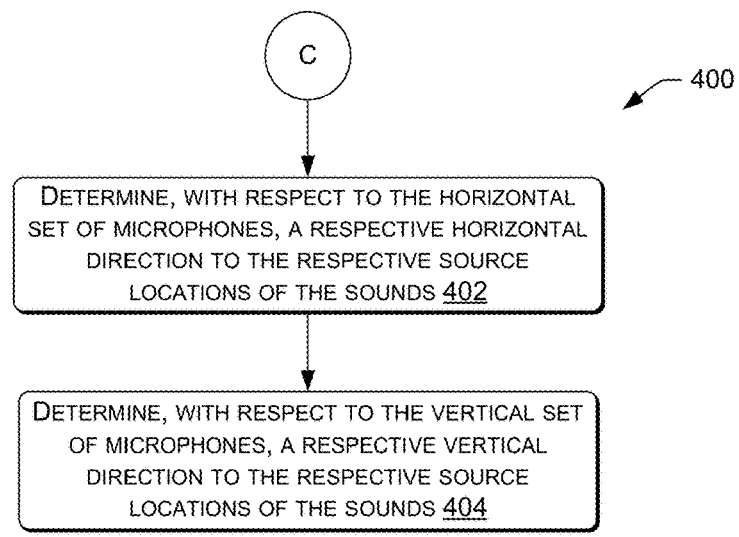
FIG. 4 illustrates a flow chart of a method for analyzing an audio signal according to an embodiment of the instant disclosure.

Inasmuch as there may be a multitude of methods that may be used to execute act 302 of analyzing the audio signal(s) received, FIG. 4 depicts a method 400 for analyzing an audio signal received by a microphone array according to an embodiment of the instant disclosure. In an embodiment, method 400 may include an act 402 of determining, with respect to the horizontal set of microphones, a respective horizontal direction to the respective sound source locations of the sounds in an audio signal. Similarly, method 400 may further include an act 404 of determining, with respect to the vertical set of microphones, a respective vertical direction to the respective sound source locations of the sounds in an audio signal. As with act 302, there may be multiple ways of determining the horizontal and vertical directions to a sound source location. Thus, example embodiments of methods for calculating the respective directions according to the instant disclosure are discussed further herein.

Figure 5:
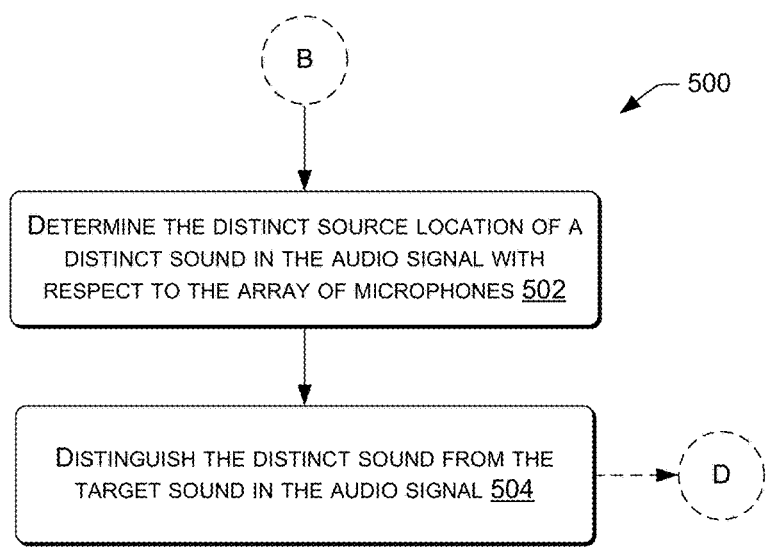
FIG. 5 illustrates a flow chart of additional steps or acts in a method for detecting a sound source location according to an embodiment of the instant disclosure.
Figure 6:
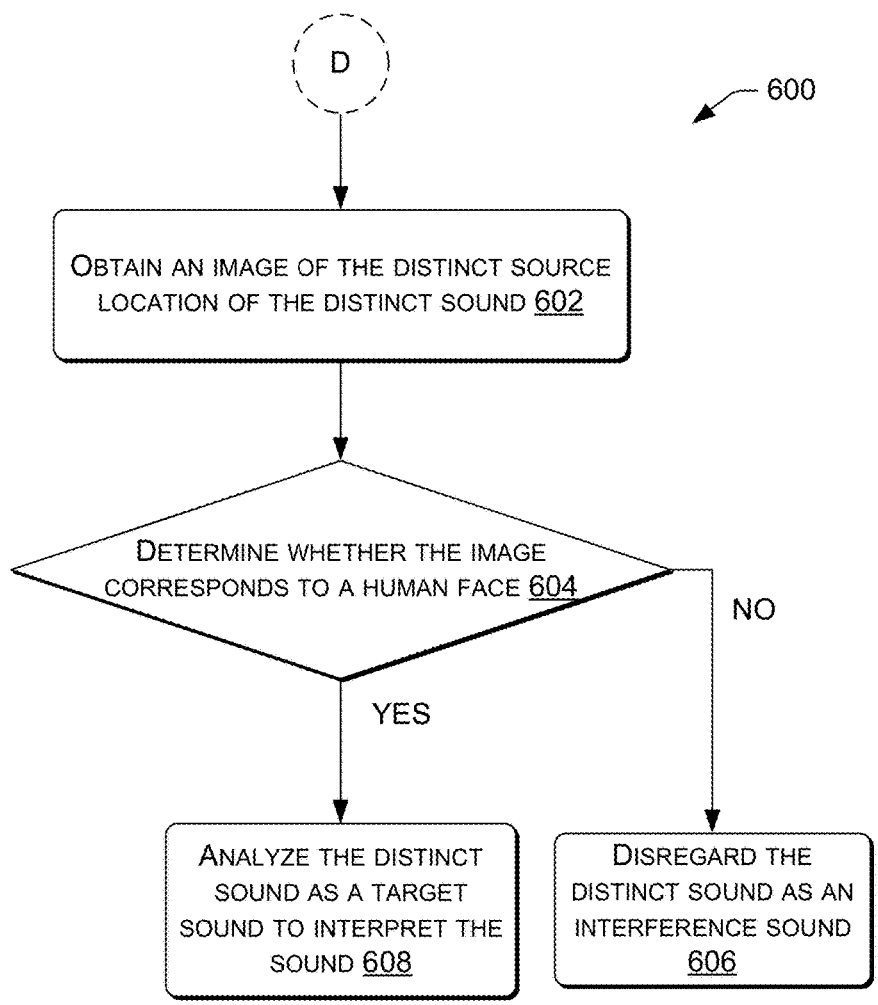
FIG. 6 illustrates a flow chart of additional steps or acts in a method for detecting a sound source location according to an embodiment of the instant disclosure.

Beyond determining a source location for a sound in an audio signal, further steps may be taken to enhance the effectiveness of the focus of the analysis to better understand a particular sound, referred to herein as a "target sound." That is, while it may be possible to simply locate the source of any given sound, a machine that is intended to respond to questions and statements from a human voice that is directed to the machine may benefit from improvements in focusing on an isolated sound, such as the voice of the person addressing the machine. Therefore, in FIG. 5, a flow chart is depicted showing additional acts of a method 500 which may be executed after determining the source location of a sound. In an embodiment, an act 502 may include selecting a distinct source location of a distinct sound in the audio signal. Further, in act 504, the distinct sound may be distinguished from a target sound in the audio signal. In an embodiment, the apparatus described herein may be able to distinguish between sound types within as little as 20 milliseconds. To distinguish the sounds and determine which sound or sounds are target sounds and which are "interference sounds" (i.e., sounds that interfere with the target sounds), in an embodiment, a method 600 may be executed. As shown in FIG. 6, method 600 may include an act 602 of obtaining an image of the distinct source location of a distinct sound. Next, in act 604, a determination is made via image analysis processes of whether the image corresponds to a frontal view of a human face. In response to a determination that the image of the distinct source location does not correspond to a frontal view of a human face, an act 606 is executed in which the distinct sound is disregarded as an interference sound. On the other hand, in response to a determination that the image of the distinct source location does correspond to a frontal view of a human face, the sound is further analyzed as a target sound to interpret and understand the voice in act 608.

Figure 7:
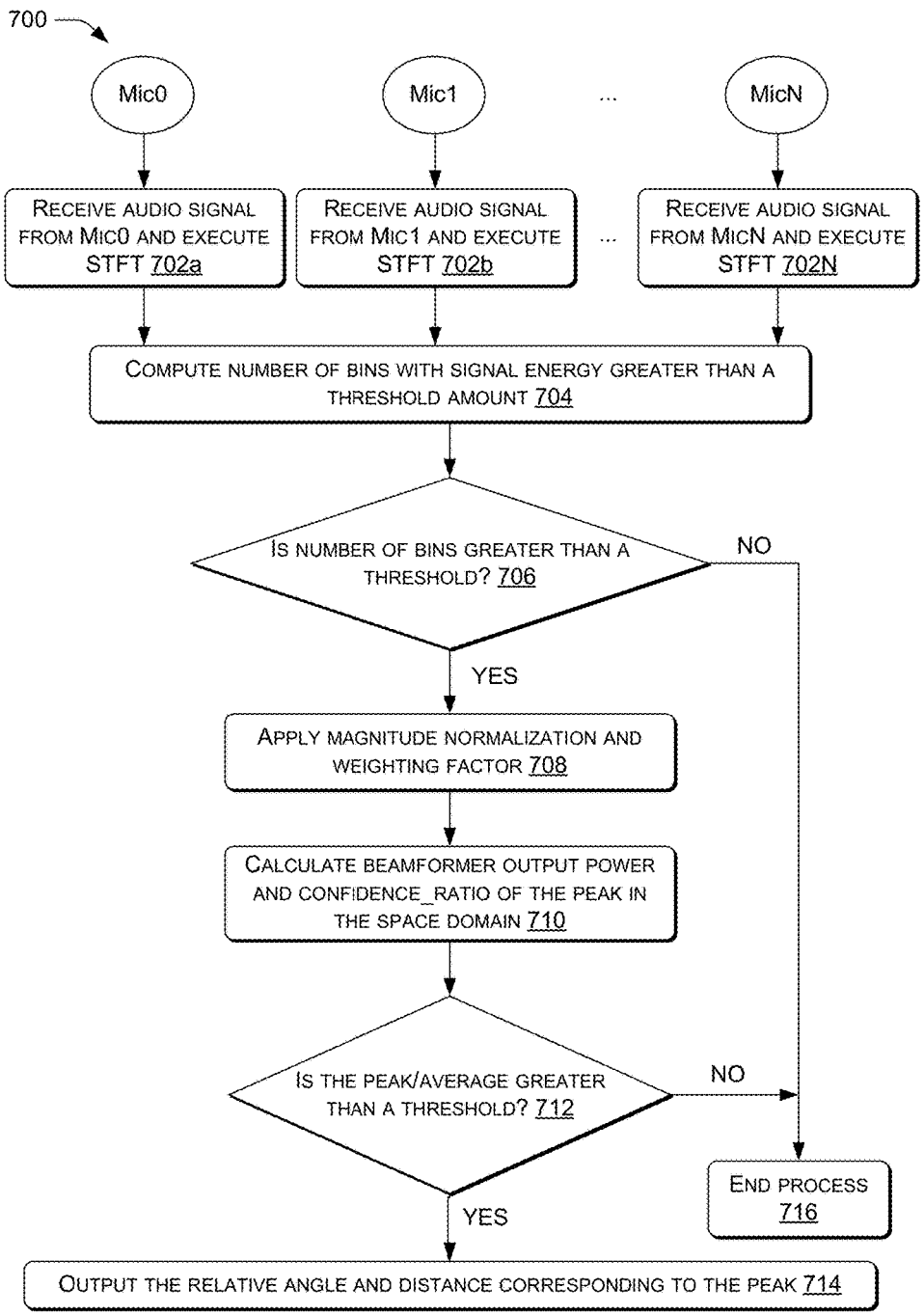
FIG. 7 illustrates a flow chart of a method of determining the direction of arrival (DOA) of a sound to the array of microphones according to an embodiment of the instant disclosure.

As indicated above, multiple methods of determining the direction to a sound source location are possible. In an embodiment according to this disclosure, FIG. 7 depicts a flow chart of a method 700 for calculating the respective directions of arrival of a sound from the horizontal set of microphones and the vertical set of microphones. In FIG. 7, the apparatus or processor of a system receives an audio signal from Mic0, Mic1, . . . to MicN of a set of microphones (e.g., the horizontal set or the vertical set). With receipt of the audio signal, Short Time Fourier Transform ("STFT") is executed in an act 702a (Mic0), 702b (Mic1), . . . to 702N (MicN). In an act 704, a computation is made based on each of the STFT results from acts 702a, 702b, . . . 702N. More specifically, in act 704, the number of frequency bins with signal energy greater than a threshold amount is computed. In act 706, the method 700 determines whether the number of frequency bins is greater than a threshold amount. If the number of frequency bins exceeds the threshold amount, the process continues by applying magnitude normalization and one or more weighting factors in act 708.

Weighting factors of act 708 may include: a factor in which a highest weight is accorded for a highest Signal-to-Noise Ratio (SNR) characteristic of the audio signal; and a factor in which a highest weight is accorded for a lowest frequency characteristic of the audio signal. Upon application of one or both of the above weighting factors, act 710 is performed by calculating the beamformer output power and the confidence ratio of the peak of the output power in the space domain. The beamformer algorithm used in the instant disclosure is based on, but not limited to, the Steered Response Power Phase Transform (SRP-PHAT), which is frequently used for sound source localization. However, in an embodiment of the instant disclosure, the algorithm is enhanced for improved location detection by being modified with the weighting factors discussed above. Thus, the result provides enhanced results for a noisy environment to be able to isolate the target sound when compared to the conventional use of SRP-PHAT.

In act 712 of method 700, it is determined whether the Peak/Average (of the result from act 710) is greater than a threshold. In response to the Peak/Average being greater than the threshold, act 714 occurs in which the relative angle and distance corresponding to the peak are output. Furthermore, in response to either a determination that the number of frequency bins is not greater than a threshold or that the Peak/Average is not greater than a threshold, the method 700 continues to act 716 where the calculation process ends.

In an embodiment using the SRP-PHAT as modified with the weighting factors, the equation (1) is solved to determine a candidate location q, which maximizes the power P of the filter-and-sum beamformer output, as follows:

$$P(q) = \int_{-\infty}^{\infty} T(\omega) \cdot T^*(\omega) \cdot w1(\omega) \cdot w2(\omega) d\omega \quad (1)$$

In order to achieve this, the components of equation (1) are explained as follows. First, the filter and sum beamformer output $T(\omega)$ of the microphone array signal is determined using equation (2) to generate the frequency domain signal.

$$T(\omega) = \Sigma_{l=1}^{N} \Sigma_{k=1}^{N} \Psi_{lk}(\omega) \cdot X_l(\omega) \cdot X_k^*(\omega) \cdot e^{j\omega(\Delta_k - \Delta_l)} d\omega \quad (2)$$

Note, the various variables in equation (2) are as follows: w is the frequency in radians; * denotes the complex conjugate; N is the number of microphones in the array; $\Psi_{lk}(\omega)$ is a weighting function in the frequency domain; $X_l(\omega)$ is the Fourier Transform of the microphone signal at microphone l (e.g., the l_th microphone signal in the frequency domain); and $\Delta_l$ is the steering vector of the l_th microphone toward the candidate source location. Furthermore:

$$\Psi_{lk}(\omega) = \frac{1}{|X_l(\omega) \cdot X_k^*(\omega)|} \quad (3)$$

Moreover, as discussed above, weighting factors $w1(\omega)$ and $w2(\omega)$ are accounted for to enhance the result. For example, a signal with a higher Signal-to-Noise Ratio (SNR) may be weighted more heavily, and a signal with a lowest frequency may be weighted more heavily since the spectra of human speech are biased towards low frequencies. Thus, $w1(\omega)$ and $w2(\omega)$ may be defined as follows:

$$w1(\omega) = \frac{\sum_{1}^{N} X_k(\omega) \cdot X_k^*(\omega)}{\sum_{1}^{N} N_k(\omega) \cdot N_k^*(\omega)} \quad (4)$$

where $N_k(\omega)$ is the noise spectrum of the kth microphone; and $$w2(\omega) = \pi - \omega \quad (5)$$

Finally, the source estimate location is found using equation (6), as follows:

$$q_s = \arg\max_q P(q) \quad (6)$$

In summary, the first derivative of the signal is obtained in the frequency domain to obtain the time difference of the voice arrival between each microphone. Then, the coordinate transformation is used to obtain the direction of the incident of the voice. Deriving the second derivative of the signal in the frequency domain then calculates the distance of the target speech from the microphone array.

Figure 8:
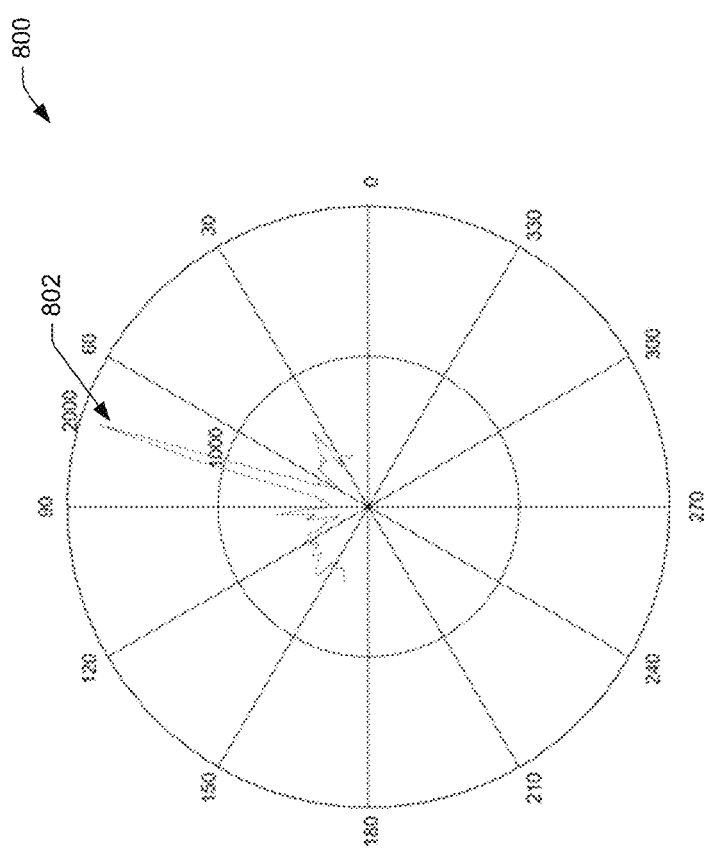
FIG. 8 illustrates a polar plot of an example of sound source location techniques according to a determination made using the method of FIG. 7.

Using the modified SRP-PHAT as described above, the power output—in each direction (i.e., horizontal and vertical)—of an example sound source captured by a microphone array according to the instant disclosure may appear as shown in FIG. 8, when plotted as a polar plot 800. In the example of FIG. 8, there appears, based on the significant visible spike 802 in the polar plot, to be a sound source at about 75 degrees. Moreover, in a case where two or more sound sources are detected in the same sound field, there would appear two or more corresponding spikes in the polar plot. The height of the peak may be used as an indicator of the type of the background noise. For example, a point source noise field usually generates a very high/sharp peak, while a diffuse source noise field may generate a low or even no obvious peak. Notably, analysis of the height of the peak may be beneficial for the following reasons: A) the analysis of the height of the peak may improve the performance of the background noise estimator ("BNE"). A traditional BNE only uses the temporal information and spectral information to find the minima over time. In contrast, in the instant application the height of the peak is used as a third parameter. If the height of the peak is large, this slows down the process. That is, the BNE adaptation rate/speed is inversely proportional to the height of the peak. Thus, this step is beneficial for improving the sensitivity of the overall angle detection algorithm; and B) the height of the peak may also be used by the beamformer for speech enhancement purposes. A well-known speech-enhancement beamforming algorithm, such as the minimum variance distortionless response ("MVDR") beamformer may use the information of the height of the peak to achieve a better performance, for example, when tracking the change of the noise field in terms of better estimating the noise co-variance matrix. For example, the noise field in a subway station may change quickly from a point noise field (e.g., a single interference person talking) to diffuse noise field (e.g., a lot of people talking). The adaptation rate in estimating the noise co-variance matrix should be set big enough to catch up with the noise field change, which is now reflected by the height of the peak in the beamformer algorithm.

Figure 9:
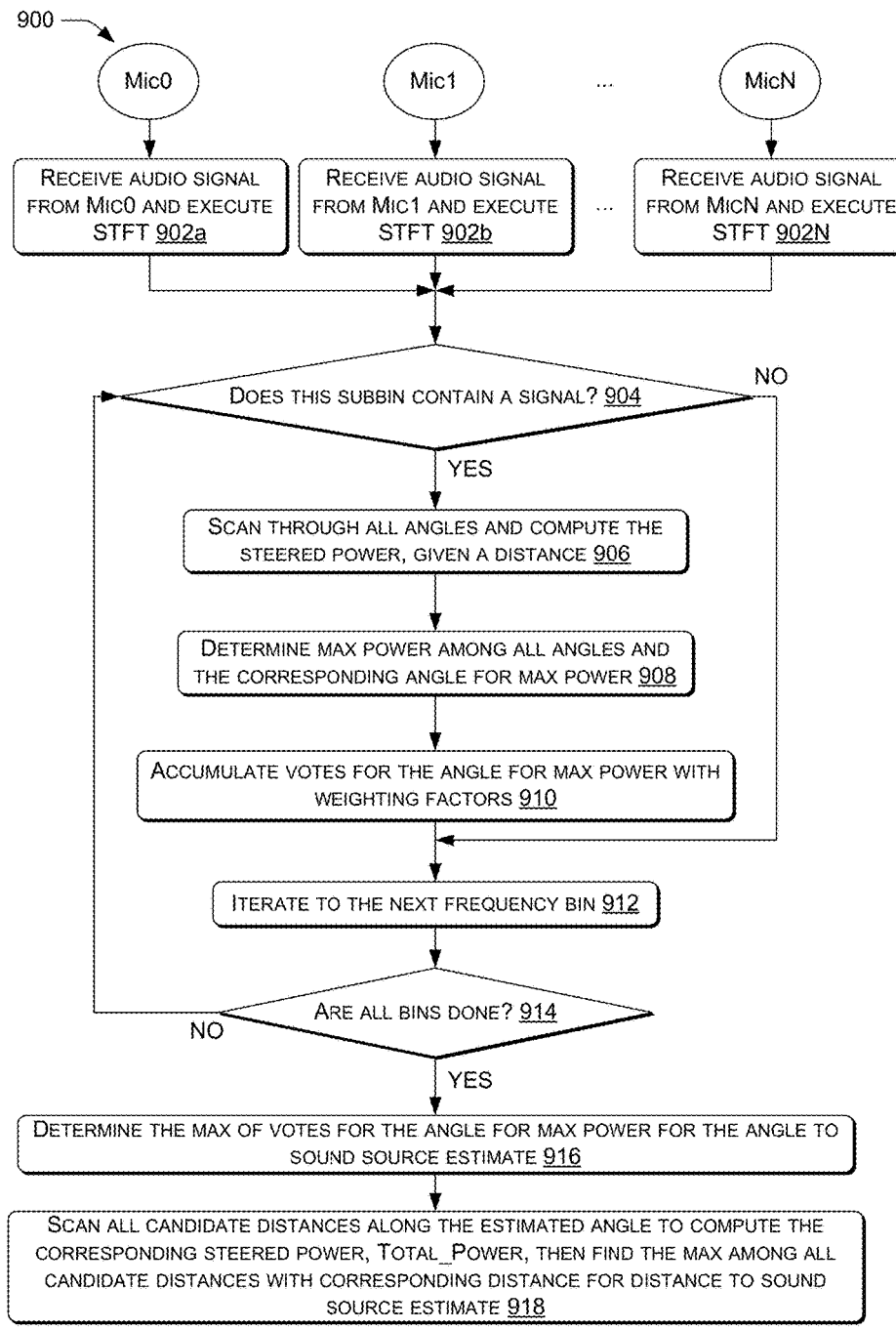
FIG. 9 illustrates a flow chart of an alternative method of determining the direction of arrival (DOA) of a sound to the array of microphones according to an embodiment of the instant disclosure.

In an alternative embodiment of calculating the angle of direction to and the distance from a sound source, according to this disclosure, FIG. 9 depicts a flow chart of a method 900 for calculating the respective directions of arrival of a sound from the horizontal set of microphones and the vertical set of microphones. It is contemplated that the voting algorithm associated with method 900 described below with respect to FIG. 9 may be more robust and of lower complexity than the algorithm associated with the method 700 described above with respect to FIG. 7.

In FIG. 9, similar to the beginning of the method of FIG. 7, the apparatus or processor of a system receives an audio signal from Mic0, Mic1, . . . to MicN of a set of microphones (e.g., the horizontal set or the vertical set). With receipt of the audio signal, STFT is executed in an act 902a (Mic0), 902b (Mic1), . . . to 902N (MicN). Since each frequency bin has one vote for an angle if there is enough signal energy in the respective frequency bin, in an act 904, an evaluation is made based on each of the STFT results from acts 902a, 902b, . . . 902N, to determine whether the frequency bin contains a signal.

In response to a determination that a frequency bin contains a signal in act 904, method 900 proceeds with act 906 by scanning through all angles of interest and computing steered power among all possible candidate angles, given a distance. Inasmuch as the angle that a frequency bin votes for is obtained by finding the maximum steered power, in act 908, the max power is determined among all angles, and the corresponding angle ("angle for max power") is associated therewith. Note, the steered power response is defined to be the power output of the microphone array with the delay and sum beamformer calculation.

Figure 10:
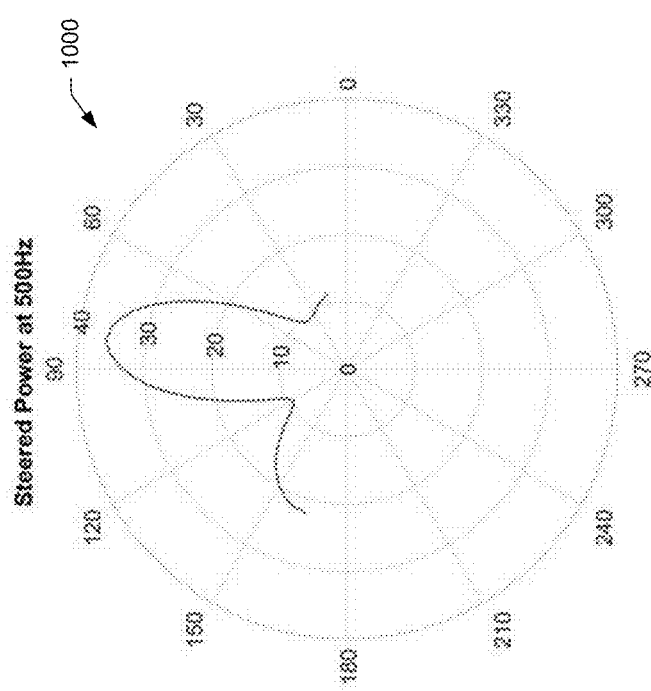
FIG. 10 illustrates a polar plot at 500 Hz of an example of sound source location techniques according to a determination made using the method of FIG. 9 for one frequency.
Figure 11:
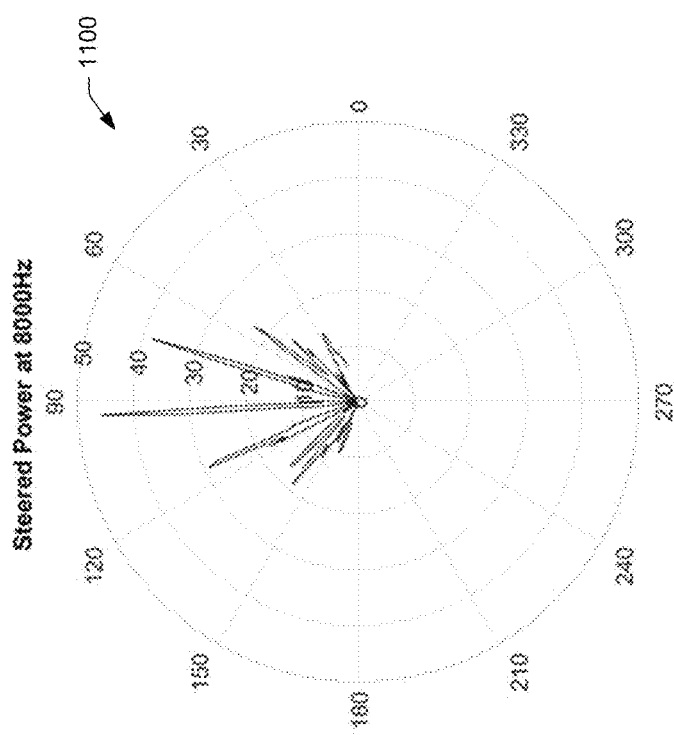
FIG. 11 illustrates a polar plot at 8000 Hz of an example of sound source location techniques according to a determination made using the method of FIG. 9 for one frequency.

In an act 910, votes for the angle for max power are accumulated with weighting factors. The weighting factors may be the Signal Noise Ratio (SNR) of the frequency, and value of the frequency itself, like the weighting factors discussed above. In act 912, the processor passes to the next frequency bin (iteration). In act 914, the processor determines whether all frequency bins have been scanned and processed through acts 906-910. In response to a determination that not all frequency bins have been scanned and processed through acts 906-910, the process returns to act 904 to continue with the next frequency bin. Moreover, in response to a determination at act 904 that a frequency bin does not contain a signal, the process skips acts 906-910 and proceeds to act 912. Finally, in response to a determination that all frequency bins have been scanned and processed, method 900 proceeds to act 916, in which a determination is made of the max votes for the angle for max power to determine the estimated angle to the sound source with respect to the apparatus. That is, the overall DOA of a signal from sound source location is determined to be the angle that receives the most votes. Then, in act 918, all candidate distances along the estimated angle are scanned to compute the corresponding steered power. The distance which corresponds to the max power along the estimated angle is determined to be the estimated distance to the source of the sound signal. In other words, each frequency bin votes for an angle by finding which angle produces the max power, for example, as shown in FIG. 10, the frequency 500 Hz votes for the angle around 80 degrees. In FIG. 11, the frequency 8000 Hz votes for the angle about 95 degrees. The algorithm loops over all frequencies, then finds which angle has the max votes.

Notably, different frequency bins may have different votes weighted by the SNR of the frequency bin and the respective frequency itself. Furthermore, the weighting rule may play an important role in terms of accuracy and sensitivity in finding the DOA of a sound source signal. For example, in an embodiment, direction detection of a sound source location may be so effective as to have an accuracy error tolerance of about 0.5 degrees.

Figure 12:
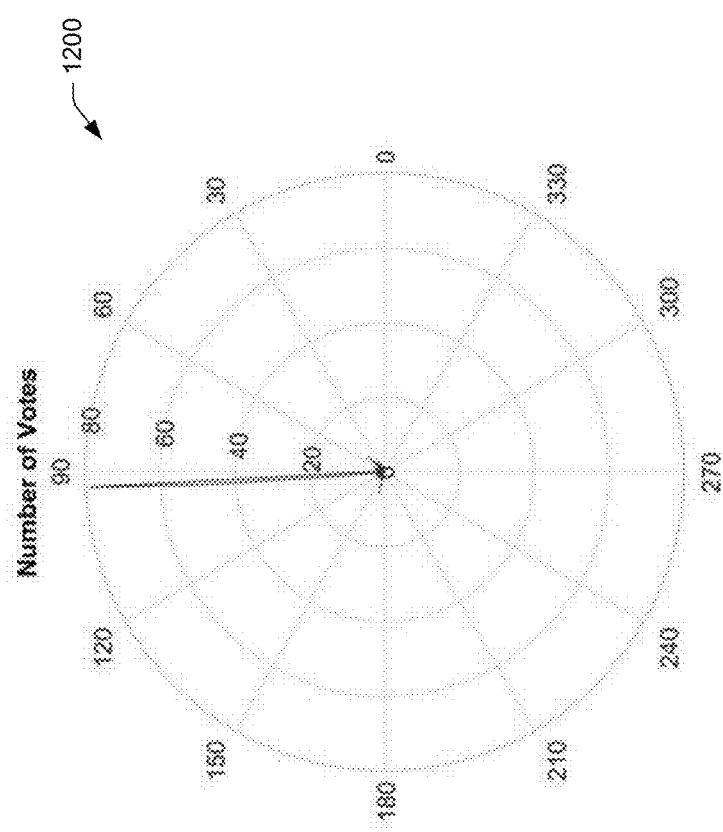
FIG. 12 illustrates a polar plot using the voting algorithm of an example of sound source location techniques according to a determination made using the method of FIG. 9.
Figure 13:
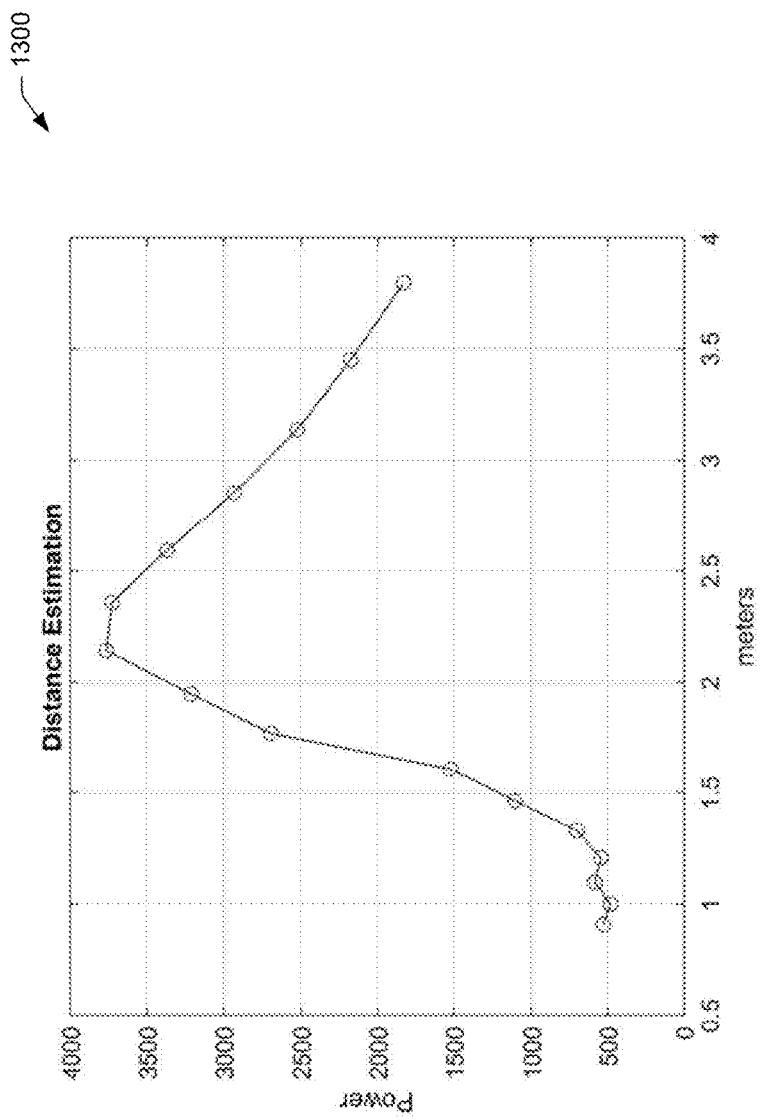
FIG. 13 illustrates a distance graph of an example of sound source location techniques according to a determination made using the method of FIG. 9.

The polar plots 1000, 1100, and 1200 depicted in FIGS. 10, 11, and 12, respectively are plots showing the estimated angle to the source of a sound signal received by an array of eight omni-directional microphones spaced 40 mm apart, as an example structural arrangement. Note, while the polar plots 1000 and 1100 are plotted with respect to the steered power at 500 Hz and 8000 Hz, respectively, polar plot 1200 is plotted with respect to the number of votes. Polar plot 1200 readily indicates that the estimated angle to the sound source from the apparatus with the microphone array is about 95 degrees in this example arrangement. Furthermore, FIG. 13 depicts a graph 1300 of the distance to the sound source versus the power calculated using the method 900 described above. In an embodiment, based at least in part on the angle estimation determined previously, the distance to the sound source may be estimated by finding the maximum steered power along the angle among all candidate distances. Thus, graph 1300 shows that the distance to the sound source from the apparatus with the microphone array is about 2.1 meters in this example.

Figure 14:
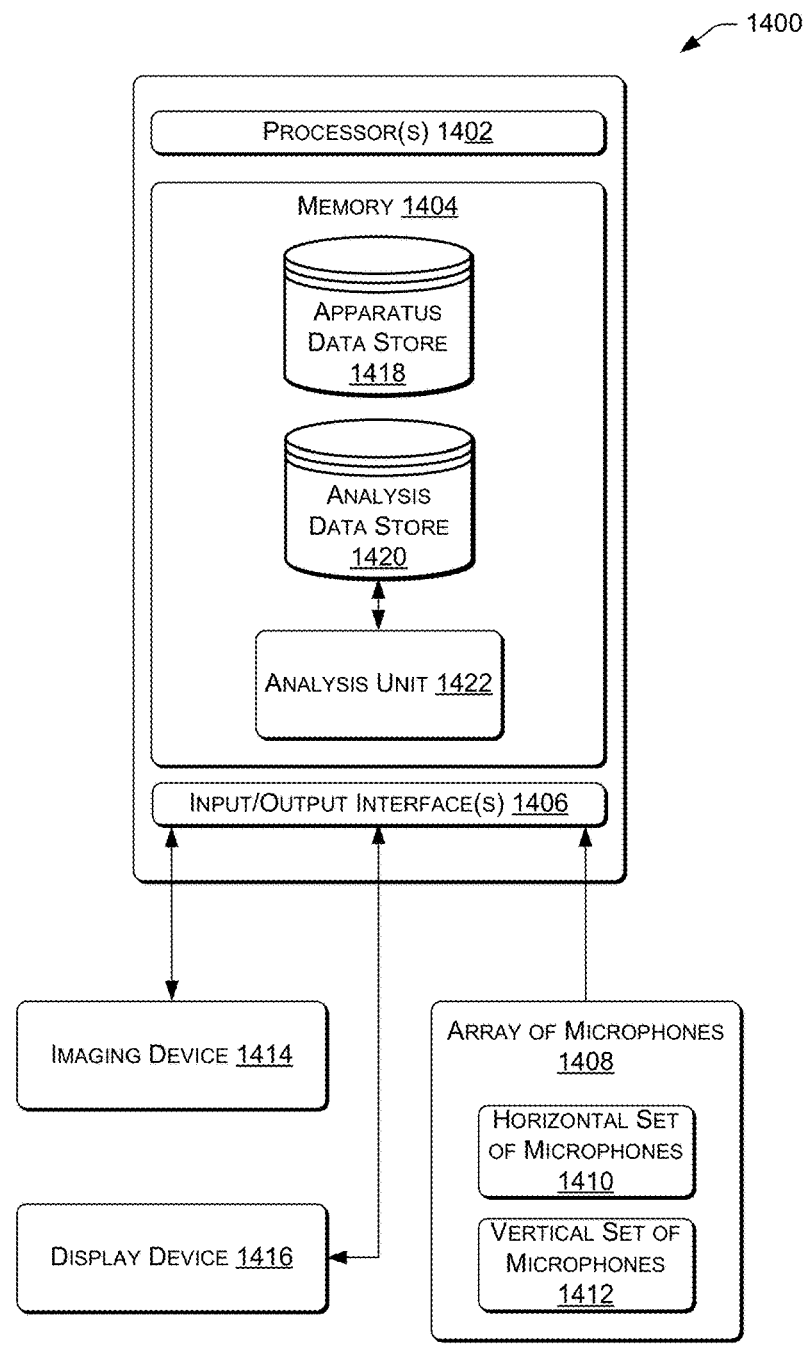
FIG. 14 illustrates a schematic of a computing device according to an embodiment of the instant disclosure.

FIG. 14 depicts an example schematic of a computing system 1400 that may be used to execute the methods discussed with respect to the instant disclosure for detecting a sound source location. Specifically, the computing system 1400 may include one or more processors 1402 and memory 1404 including instructions to cause the one or more processors 1402 to perform one or more methods for detecting a sound source location. One or more input/output interfaces ("I/O interface") 1406 may be included to interface with an array of microphones 1408. The array of microphones 1408 may include a horizontal set of microphones 1410 and a vertical set of microphones 1412. In an embodiment, the computing system 1400 may further include an imaging device 1414 and/or a display device 1416 that are communicatively coupled with the one or more processors 1402 via the one or more I/O interfaces 1406. The memory 1404 may include an apparatus data store 1418 containing information regarding the information and/or products of the apparatus. The memory 1404 may further include an analysis information data store 1420, which contains information such as previous analysis data for use in improving the performance of the apparatus and/or computing system 1400, and/or for statistical analysis, etc.

The analysis information data store 1420 is in communication with an analysis unit 1422 that performs calculations based on input received from the one or more I/O interfaces 1406.

The memory 1404 may include computer-readable media in the form of volatile memory, such as random-access memory (RAM) and/or non-volatile memory, such as read only memory (ROM) or flash RAM. The memory 1404 is an example of computer-readable media.

Computer-readable media includes volatile and non-volatile, removable and non-removable media implemented in any method or technology for storage of information such as computer readable instructions, data structures, program modules, or other data. Examples of computer storage media include, but are not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that may be used to store information for access by a computing device. As defined herein, computer-readable media does not include transitory media such as modulated data signals and carrier waves.

CONCLUSION

Although several embodiments have been described in language specific to structural features and/or methodological acts, it is to be understood that the claims are not necessarily limited to the specific features or acts described. Rather, the specific features and acts are disclosed as illustrative forms of implementing the claimed subject matter.

What is claimed is:

1. An apparatus for detecting a source location of a target sound in a noisy environment, comprising:
    a housing;
    an array of microphones disposed with the housing, the array of microphones including:
        a horizontal set of microphones that are linearly-aligned; and
        a vertical set of microphones that are linearly-aligned;
    one or more processors communicatively coupled with the array of microphones; and
    memory communicatively coupled with the one or more processors, the memory including instructions, which when executed, cause the one or more processors to perform acts including:
        receiving an audio signal including the target sound from the horizontal set of microphones and the vertical set of microphones; and
        determining a source location of the target sound in the audio signal with respect to the apparatus, the determining including:
            analyzing the audio signal, the analyzing including:
                determining, with respect to the horizontal set of microphones, a horizontal direction to the source location of the target sound; and
                determining, with respect to the vertical set of microphones, a vertical direction to the source location of the target sound; and
            calculating a distance between the source location of the target sound and the apparatus.

2. The apparatus according to claim 1, wherein the audio signal further includes at least one distinct sound that is different than the target sound and is received from a distinct source location; and
    wherein the acts further include:
        determining the distinct source location of the distinct sound in the audio signal with respect to the apparatus; and
        distinguishing the distinct sound from the target sound.

3. The apparatus according to claim 2, wherein the distinguishing the distinct sound from the target sound includes:
    obtaining an image of the distinct source location of the distinct sound;
    determining whether the image corresponds to a frontal view of a human face; and
    disregarding the distinct sound as an interference sound, in response to a determination that the image does not correspond to a frontal view of a human face.

4. The apparatus according to claim 1, wherein the determining the horizontal direction to the source location of the target sound includes determining a horizontal candidate location that maximizes a power output calculated from the audio signal, the horizontal candidate location being an expression of an angular measurement of an orientation of the source location of the target sound with respect to a position of the apparatus.

5. The apparatus according to claim 1, wherein the determining the vertical direction to the source location of the target sound includes determining a vertical candidate location that maximizes a power output calculated from the audio signal, the vertical candidate location being an expression of an angular measurement of an orientation of the source location of the target sound with respect to a position of the apparatus.

6. The apparatus according to claim 1, wherein the analyzing the audio signal further includes applying a weighting factor in which a highest weight is accorded for a highest Signal-to-Noise Ratio (SNR) characteristic of the audio signal.

7. The apparatus according to claim 1, wherein the analyzing the audio signal further includes applying a weighting factor in which a highest weight is accorded for a lowest frequency characteristic of the audio signal.

8. The apparatus according to claim 1, wherein the analyzing the audio signal further includes estimating background noise using space domain data,
    wherein an adaptation rate depends on a height of a peak of the audio signal.

9. A system for detecting respective source locations of sounds in an audio signal, comprising:
    one or more processors configured to receive the audio signal from a horizontal set of microphones that are linearly-aligned and a vertical set of microphones that are linearly-aligned; and
    memory communicatively coupled with the one or more processors, the memory including instructions, which when executed, cause the one or more processors to perform acts including:
        receiving the audio signal from the horizontal set of microphones and from the vertical set of microphones; and
        determining the respective source locations of the sounds in the audio signal, the determining including:
            analyzing the audio signal, the analyzing including:

determining, with respect to the horizontal set of microphones, a respective horizontal direction to the respective source locations of the sounds; and determining, with respect to the vertical set of microphones, a respective vertical direction to the respective source locations of the sounds; and calculating a distance between the respective source locations of the sounds and the horizontal set of microphones and the vertical set of microphones.

10. The system according to claim 9, wherein the sounds in the audio signal include an interference sound and a target sound; and wherein the acts further include:

determining the respective source locations of the interference sound and the target sound with respect to the horizontal set of microphones and the vertical set of microphones; and distinguishing the interference sound from the target sound via image analysis.

11. The system according to claim 10, wherein the acts further include executing a noise-reduction algorithm using the respective source locations of the sounds to optimize comprehension of the target sound and minimize interference from the interference sound.

12. The system according to claim 9, wherein the determining the respective horizontal direction, to the respective source location of the sounds includes determining horizontal candidate locations, respectively, that maximize a power output calculated from the audio signal, the horizontal candidate locations being calculated as angular measurements of an orientation of the source locations of the sounds with respect to the horizontal set of microphones.

13. The system according to claim 9, wherein the determining the respective vertical direction, to the respective source location of the sounds includes determining vertical candidate locations, respectively, that maximize a power output calculated from the audio signal, the vertical candidate locations being calculated as angular measurements of an orientation of the source locations of the sounds with respect to the vertical set of microphones.

14. The system according to claim 9, wherein the analyzing the audio signal further includes applying a weighting factor in which a highest weight is accorded for a highest Signal-to-Noise Ratio (SNR) characteristic of the audio signal.

15. The system according to claim 9, wherein the analyzing the audio signal further includes applying a weighting factor in which a highest weight is accorded for a lowest frequency characteristic of the audio signal.

16. A method of detecting respective source locations of sounds in an audio signal, the method comprising:

receiving the audio signal via a horizontal set of microphones and a vertical set of microphones, the horizontal set of microphones being linearly-aligned, and the vertical set of microphones being linearly-aligned; and determining the respective source locations of the sounds in the audio signal, the determining including:

analyzing the audio signal, the analyzing including:

determining, with respect to the horizontal set of microphones, a respective horizontal direction to the respective source locations of the sounds; and determining, with respect to the vertical set of microphones, a respective vertical direction to the respective source locations of the sounds; and calculating a distance between the respective source locations of the sounds and the horizontal set of microphones and the vertical set of microphones.

17. The method according to claim 16, further comprising orienting an imaging device to view the source locations, respectively, of the sounds in the audio signal.

18. The method according to claim 16, further comprising:

determining whether a sound in the sounds in the audio signal is an interference sound or a target sound; and disregarding any interference sounds.

19. The method according to claim 18, further comprising sending the target sound to a processor to perform voice recognition and decipher a meaning of the target sound.

20. The method according to claim 18, wherein the determining whether a sound is an interference sound or a target sound is distinguishable in as little as 20 milliseconds.

* * * * *